G. WOOD AND E. REAGAN.
AUTOMOBILE LIFTING GRAPPLE.
APPLICATION FILED MAY 19, 1919.

1,320,723.  Patented Nov. 4, 1919.

Inventors
E. Reagan.
G. Wood
By Jack A. Ohley
Attorney

UNITED STATES PATENT OFFICE.

GUY WOOD AND EMMET REAGAN, OF DILLEY, TEXAS.

AUTOMOBILE-LIFTING GRAPPLE.

1,320,723. Specification of Letters Patent. Patented Nov. 4, 1919.

Application filed May 19, 1919. Serial No. 298,250.

*To all whom it may concern:*

Be it known that we, GUY WOOD and EMMET REAGAN, citizens of the United States, residing at Dilley, in the county of Frio and State of Texas, have invented certain new and useful Improvements in Automobile-Lifting Grapples, of which the following is a specification.

This invention relates to new and useful improvements in motor vehicle lifting grapples.

The purpose of the invention is to provide means for use in repairing a motor vehicle whereby either the front end or the rear end of the chassis may be lifted as desired.

In carrying out the invention a pair of grapple members or bars are joined together so as to be connected with a lifting chain or the like. Each member has an angular hook at its extreme end and an angular side hook a short distance therefrom, the end hook being in a plane parallel to the member and the side hook in a plane transverse to the member. The ends are designed to catch under the front end of the chassis, while the side hooks are positioned to engage under the rear end of the chassis.

Figure 1:
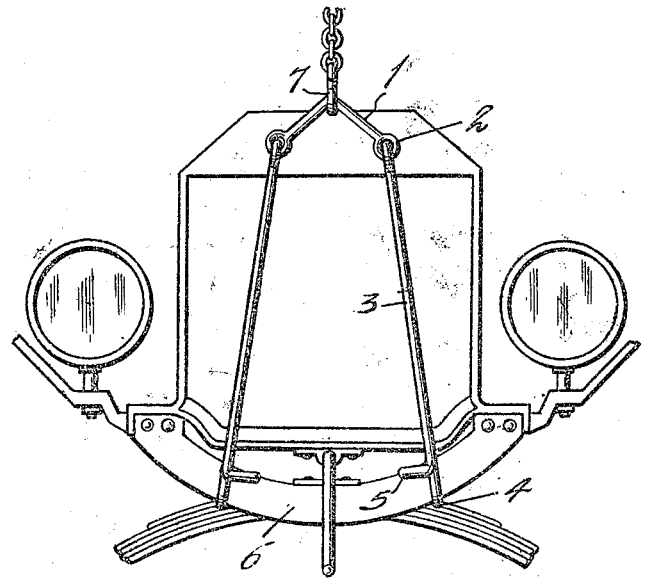
Figure 2:
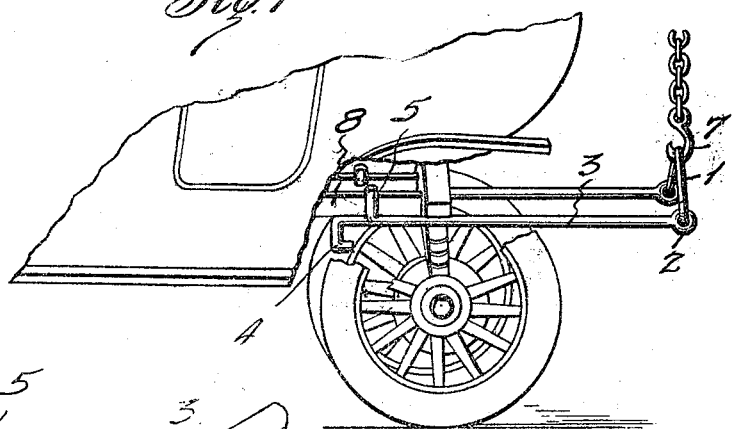
Figure 3:
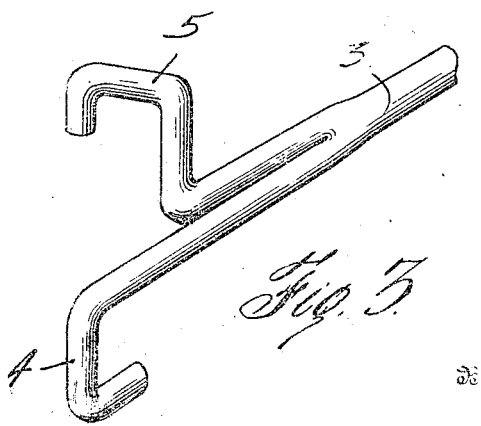

The invention will be more readily understood from a reading of the following specification and by reference to the accompanying drawings, in which an example of the invention is shown and wherein:

Figure 1 is a front elevation of a portion of an automobile with portions broken away to show the application of a grapple in position thereon, Fig. 2 is a partial insometric view of an automobile with portions broken away to show the application of a grapple to the rear end, and Fig. 3 is a perspective view of the hooks of one of the members.

In the drawings the numeral 1 designates a yoke having eyes 2 at its ends. From each eye a grapple member 3 depends. The members may be made from stout round bars or other suitable metal. Each member terminates at its outer or free end in an angular hook 4 parallel to the longitudinal plane of the member. A short distance from the hook 4 of each member an angular side hook 5 is formed integral with the member in any approved manner. The side hook is directed transversely of the members. The members are mounted on the yoke so that the hooks 5 project toward each other.

When it is desired to lift the front end of an automobile chassis the grapple members 3 are disposed with their hooks 4 directed rearwardly, whereby the hooks 5 are directed forwardly and out of the way. The hooks 4 are engaged under the front cross bar 6 of the chassis or any other part of the front end according to the structure of the frame. The yoke is engaged in a hook 7 of a suitable hoist whereby the chassis and body are readily lifted. The members being engaged with the chassis on each side of the center equally support the latter.

When it is desired to lift the rear end the members are passed under the rear end of the chassis with hooks 5 directed upwardly and the hooks 4 disposed underneath as is shown in Fig. 2. The hooks 5 are engaged over the side bars 8 of the chassis and the members support the rear end when lifted by the hoist.

What we claim is:

1. In apparatus of the character described, a pair of members, each member embodying a rod having a substantial length, a substantially L-shaped hook carried by the free end of the rod and extending longitudinally thereof, a substantially U-shaped hook secured to the rod at a point spaced rearwardly a substantial distance from the substantially L-shaped hook, the substantially U-shaped hook extending transversely of the rod and disposed at substantially a right angle with relation thereto, and suspension means connected with the rear ends of the rods.

2. In apparatus of the character described, a pair of members, each member embodying a rod having a substantial length, a substantially L-shaped hook carried by the free end of the rod and extending longitudinally thereof, said hook being adapted to engage beneath the transverse forward portion of an automobile frame when the rod is in an approximately vertical position, a substantially U-shaped hook secured to the rod and spaced rearwardly a substantial distance from the free end of the substantially L-shaped hook, the substantially U-shaped hook extending transversely of the rod and disposed at substantially a right angle with relation to the substantially L-shaped hook, the substantially U-shaped hook being adapted to be inverted and to engage over the rear portion of the longitudinal beam of the automobile frame when the rod is approximately horizontal and engaging beneath the rear transverse portion of the frame, an element connecting the rear ends of the rods, and means to raise the element.

In testimony whereof we affix our signatures.

GUY WOOD.
EMMET REAGAN.